(12) United States Patent
Huang et al.

(10) Patent No.: US 8,092,783 B2
(45) Date of Patent: *Jan. 10, 2012

(54) GADOLINIUM CONTAINING PRUSSIAN BLUE NANOPARTICLES AS NONTOXIC MRI CONTRAST AGENTS HAVING HIGH RELAXIVITY

(75) Inventors: Songping D. Huang, Kent, OH (US); Yongxiu Li, Kent, OH (US); Mohammadreza Shokouhimehr, Kent, OH (US)

(73) Assignee: Kent State University, Kent, OH (US)

( * ) Notice: Subject to any disclaimer, the term of this patent is extended or adjusted under 35 U.S.C. 154(b) by 362 days.

This patent is subject to a terminal disclaimer.

(21) Appl. No.: 12/384,391

(22) Filed: Apr. 3, 2009

(65) Prior Publication Data

US 2010/0254912 A1    Oct. 7, 2010

(51) Int. Cl.
*A61B 5/055*    (2006.01)

(52) U.S. Cl. ....... 424/9.36; 424/1.11; 424/9.1; 424/9.32

(58) Field of Classification Search ................. 424/1.11, 424/1.65, 1.81, 9.1, 9.3, 9.4, 9.5, 9.6, 9.7, 424/9.8

See application file for complete search history.

(56) References Cited

U.S. PATENT DOCUMENTS 3,904,737 A * 9/1975 Paris et al. .................... 423/252

FOREIGN PATENT DOCUMENTS

JP    2008046001    * 2/2008

OTHER PUBLICATIONS

Broschova et al, Czechoslovak Journal of Physics, vol. 52, No. 2, pp. 325-328, (2002).*
Livramento, et al, High Relaxivity Confined to a Small Molecular Space: . . . , Angew. Chem. Int. Ed, 2005, vol. 44, pp. 1480-1484, Wiley-VCH Verlag GmbH & Co, Weinheim.
Werner, et al., High-Relaxivity MRI Contrast Agents: Where Coordination . . . , Angew. Chem. Int. Ed., 2008, vol. 47, pp. 8568-8580, Wiley-VCH Verlag Gmbh & Co., Weinheim.
Caravan, Strategies for increasing the sensitivity of gadolinium based MRI contrast agents, Chem. Soc. Rev., 2006, vol. 35, pp. 512-523, Royal Society of Chemistry.
Caravan, et al., Gadolinium(III) Chelates as MRI Contrast Agents: . . . , Chem. Rev., 1999, vol. 99, pp. 2293-2352, ACS Publications, Washington, DC, USA.
Chan, et al., Small molecular gadolinium(III) complexes as MRI contrast agents . . . , ScienceDirect, Coordination Chem. Rev., 2007, Vo. 251, pp. 2428-2451, Elsevier B.V.
Bottrill, et al., Lanthanides in magnetic resonance imaging, Chem. Soc. Rev., 2006, vol. 35, pp. 557-571, The Royal Society of Chemistry, published on web.
Hermann et al., Gadolinium(III) complexes as MRI contrast agents: . . . , Dalton Trans., 2008, pp. 3027-3047, The Royal Society of Chemistry, published on web.

* cited by examiner

*Primary Examiner* — D L Jones
(74) *Attorney, Agent, or Firm* — Hudak, Shunk & Farine Co. LPA

(57) ABSTRACT

Gadolinium$^{+3}$ ($Gd^{3+}$) containing (or incorporated) Prussian blue lattice contrast agents that can be used as an MRI contrast agent have unexpectedly improved $r_1$ relaxivities of 1 or 2 magnitudes higher than the commercial $Gd^{3+}$-chelates as well as exceedingly, non-toxic, low release of the $Gd^{3+}$ ions into an aqueous environment at a pH of about 2 to about 7.5. The Prussian blue lattice containing $Gd^{3+}$ ions therein can be used for clinical diagnosis intravenously to human beings for medical imaging. The particle sizes of the doped Prussian blue lattices are of a nanosize scale and are very stable against agglomeration.

19 Claims, 1 Drawing Sheet

GADOLINIUM CONTAINING PRUSSIAN BLUE NANOPARTICLES AS NONTOXIC MRI CONTRAST AGENTS HAVING HIGH RELAXIVITY

FIELD OF THE INVENTION

The present invention relates to the preparation of a new class of materials with Prussian blue-like structure and their use as MRI contrast agents

BACKGROUND OF THE INVENTION

Magnetic resonance imaging (MRI) is a noninvasive and nonradioactive diagnostic modality that has found increasing applications in diagnostic medicine. In general, the image contrast obtained from MRI is a function of proton density of tissues under examination and the relative longitudinal and transversal relaxation times $T_1$ and $T_2$. Under normal conditions, the variation of proton density in different tissues is relatively small, which makes MRI contrast enhancement possible by administration of a contrast agent (CA). The latter is a chemical compound capable of altering the relaxation times of water protons in tissues. The MRI contrast agents are usually divided into two different types base on which relaxation time they can alter to a greater extend: $T_1$-weighted agents and $T_2$-weighted agents. A $T_1$ agent shortens the longitudinal relaxation time $T_1$ of protons from water to a greater extent than the transversal relaxation time $T_2$ and can brighten up the regions where the agent is present. Conversely, a $T_2$ agent can produce darkened spots in the tissues reached by the agent. It is estimated that ca. 30% of all clinical MRI diagnostic procedures are performed with use of a $T_1$ contrast agent. This amounts to over 20 million doses of MRI contrast agents administered worldwide annually. For clinical diagnostic applications, $T_1$ agents are superior to $T_2$ agents. All the $T_1$ agents currently used in clinical MR imaging are $Gd^{3+}$-based paramagnetic complexes with various polyaminopolycarboxylate ligands. MRI contrast agents approved for clinical applications include

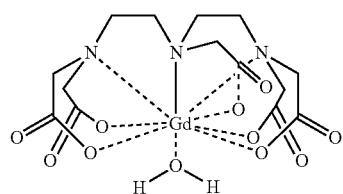

[Gd(DTPA)(H₂O)]²⁻(Magnevist™)

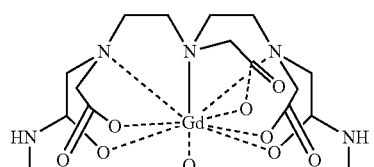

[Gd(DTPA-BMA)(H₂O)](Omniscan™)

-continued

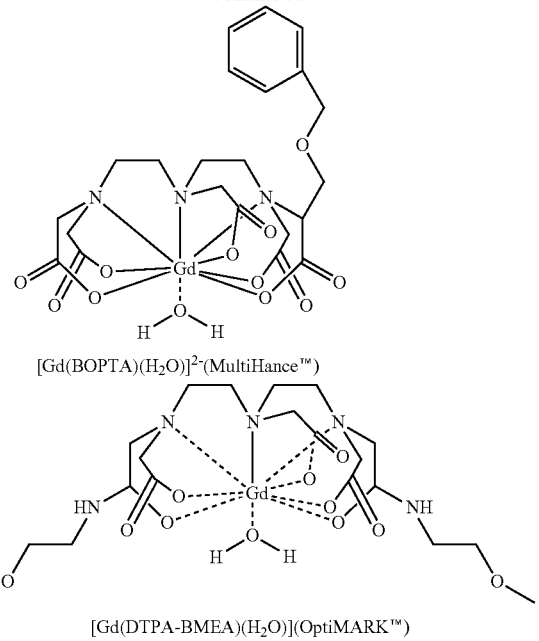

[Gd(BOPTA)(H₂O)]²⁻(MultiHance™)

[Gd(DTPA-BMEA)(H₂O)](OptiMARK™)

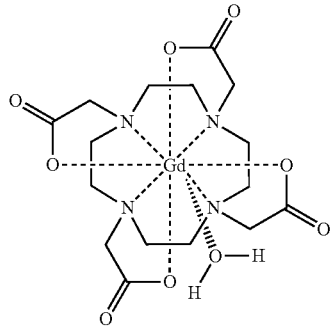

[Gd(DOTA)(H₂O)](Dortarem™)

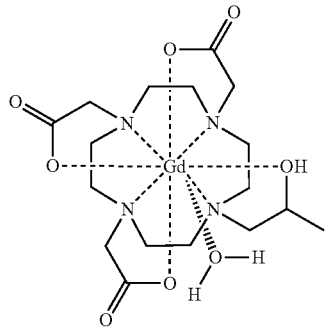

[Gd(HP-DO3A)H₂O)](ProHence™)

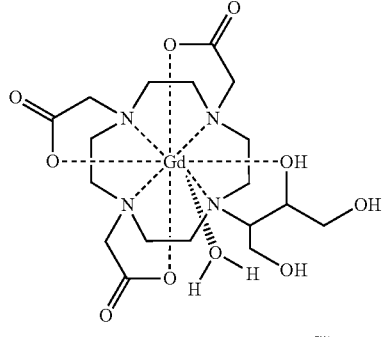

[Gd(DO3A-butrol)H₂O)](Gadovist™)

There are two problems associated with the current generation of commercial $Gd^{3+}$-based MRI contrast agents: (i) toxicity issue, and (ii) the low relaxivity of these agents in high magnetic fields. As set forth below, these two problems are somewhat interconnected.

Firstly, the toxicity of free $Gd^{3+}$ ions stems from the fact that the ionic radius of Gd(III) is similar to that of calcium(II). Hence, the presence of this abiological heavy metal ion in the body can disrupt the normal $Ca^{2+}$-mediated signaling or accumulate in certain organs by forming strong complexes with biological ligands in vivo. Prior to their approval for clinical use, many in vitro studies had shown that formation of a chelate between $Gd^{3+}$ ion and a polyaminopolycarboxylate ligand molecule can provide high thermodynamic stability and kinetic inertness, thus preventing the release of toxic $Gd^{3+}$ ions.

However, the complex biochemical, pharmacokinetic and metabolic properties of such chelates render this in vitro working model unreliable for ensuring the in vivo safety. Recently, the toxicity of the $Gd^{3+}$-based MRI contrast agents has been linked to nephrogenic systemic fibrosis (NSF) and nephrogenic fibrosing dermopathy (NFD).

Secondly, the use of high magnetic field MR instruments has been increased steadily in the recent years. The high-field scanners can greatly shorten data acquisition time, improve signal-to-noise ratio (SNR) and provide high spatial resolution. Particularly, high resolution imaging with sufficient contrast is critical for applications such as vasculature in tumors, brain perfusion in stroke and blood clot in micro vessels, etc. All the commercial $T_1$ agents are low molecular weight complexes. Due to the rapid molecular tumbling motion and vibrational flexibility of the small molecules, these contrast agents have relaxivity values that are only a few percent of the maximum possible value predicted by the theoretic model (i.e. Solomon-Bloembergen-Morgan theory).

Furthermore, these agents show reduced relaxivity due to the increase in Larmor frequency at higher magnetic fields. The relaxivity is the measure of efficiency of an agent. It is normally quoted as a concentration-normalized rate $r_1$ ($mM^{-1} s^{-1}$), i.e. the amount of increase in $1/T_1$ per millimole of agent. The typical commercial $T_1$ agent (e.g. Magnevist@) has the relaxivity of 4.1 $mM^{-1} \times s^{-1}$ at the currently most common magnetic field strength used for clinical applications ($B_0$=1.5 Tesla or T). In order to be effective at even this modest field strength, a rather high concentration (>0.1 mM) of the agent in the body is required. This means doses as high as 0.3 mmol or ~28 mg per kilogram body weight need to be given for most clinical applications to obtain adequate image contrast. However, when the magnetic field is increased to 3.0 or 7.0 T, the performance of the commercial agents becomes very poor unless the concentration of the agent is raised accordingly. This definitely increases the risk of renal toxicity. The relaxivity of any small-molecule MRI contrast agent is dependent on molecular motion which, in turn, is dependent on molecular size and rigidity. The current strategies for increasing relaxivity in these materials are all focused on increasing molecular weight or/and on restricting molecular motion in MRI contrast agents. By attaching multiple $Gd^{3+}$ chelates through covalent or noncovalent bonding to dendrimers, polymers, high relaxivity values, ranging from 10.6 to 39.0 $mM^{-1} \times s^{-1}$, have been obtained at a magnetic field strength of 1.5 Tesla.

Along the same line, nanoparticles containing $Gd^{3+}$ ions with high relaxivity can be assembled using lipid-perfluorocarbon emulsions as a platform to absorb $Ga^{3+}$-chelates with long alkyl chains. It should be noted that all these approaches use the same small molecule chelate platform, thus providing mechanisms that are only capable of increasing relaxivity, but incapable of preventing in vivo release of free $Gd^{3+}$ ions.

Inasmuch as the present invention relates to a gadolinium containing Prussian blue lattices for use in MRI, the general attributes and uses of MRI will now be set forth.

Medical imaging modalities allow the visualization of the organs within a human body. For example, computed tomography (CT) also known as computed axial tomography (CAT): employs X-rays to produce 3D images. In the U.S., there were about 62 million scans done in 2006. Although non-invasive, CT is regarded as a moderate to high radiation diagnostic technique.

Another example of medical imaging technology is positron emission tomography (PET) and single photon emission computed tomography (SPECT). PET and SPECT use a short-lived radioactive isotope that undergoes a decay to emit a positron or gamma rays. In the U.S., there are about 20 million diagnostic medical procedures done every year. Both techniques expose the patient to low-level radiation and therefore impose risk to the patient.

A further medical imaging technology is magnetic resonance imaging (MRI). MRI uses a powerful magnetic field to align the nuclear magnetization of protons in water. It provides much greater contrast than does CT. In the United States alone, millions of MRI exams are given annually.

Magnetic resonance imaging (hereinafter referred to as "MRI") has emerged as a prominent noninvasive diagnostic tool in clinical medicine and biomedical research. Among its many advantages, MRI can produce images with large contrast to visualize the structure and function of the body. It provides detailed images of the body in any plane. MRI generally provides much greater contrast between different soft tissues of the body as compared to other techniques, making it particularly useful in musculoskeletal imaging, cardiovascular and vascular imaging, neurological imaging, oncological imaging and other body parts or functions and diseases. Unlike CT or PET, MRI uses no ionizing radiation, but instead uses a magnetic field to align the nuclear magnetization of atoms (usually hydrogen atoms) in the body. The MRI imaging techniques therefore provide high quality images without exposing the patient to any kind of harmful radiation. The diagnostic power of MRI can be further enhanced with the use of a contrast agent. It is estimated that about 30% of all clinical MRI diagnostic examinations are performed with the intravenous injection of a contrast agent. This constitutes millions of doses of MRI contrast agent administered worldwide annually.

In magnetic resonance imaging (MRI) an image of an organ or tissue is obtained by placing a subject in a strong magnetic field and observing the interactions between the magnetic spins of the protons and radiofrequency electromagnetic radiation. The magnetic spins produce an oscillating magnetic field which induces a small current in the receiver coil, wherein this signal is called the free induction decay (FID). Two parameters, termed proton relaxation times, are of primary importance in the generation of the image. They are called $T_1$ (also called the spin-lattice or longitudinal relaxation time) and $T_2$ (the spin-spin or transverse relaxation time). The time constant for the observed decay of the FID is called the $T_2^*$ relaxation time, and is always shorter than $T_2$. The $T_1$, $T_2$ and $T_2^*$ relaxation times depend on the chemical and physical environment of protons in various organs or tissues.

In some situations or tissues, the MRI image produced may lack definition and clarity due to a similarity of the signal from different tissues or different compartments within a tissue. In some cases, the magnitude of these differences is small, limiting the diagnostic effectiveness of MRI imaging. Image contrast is created by differences in the strength of the NMR signal recovered from different locations within the tissue or sample. This depends upon the relative density of excited nuclei (such as water protons), on differences in the relaxation times $T_1$, $T_2$ and $T_2^*$ of those nuclei. The type of imaging pulse sequence may also affect contrast. The ability to choose different contrast mechanisms gives MRI tremendous flexibility. In some situations, the contrast generated may not adequately show the tissues, anatomy or pathology as desired, and a contrast agent may enhance such contrast. Thus, there exists a need for improving image quality is through the use of contrast agents.

Contrast agents are substances which exert an effect on the nuclear magnetic resonance (NMR) parameters of various chemical species around them. Ordinarily, these effects are strongest on the species closest to the agent, and decrease as the distance from the agent is increased. Thus, the areas closest to the agent will possess NMR parameters which are different from those further away. Proper choice of a contrast agent will, theoretically, result in uptake by only a certain portion of the organ or a certain type of tissue (e.g., diseased tissues), thus providing an enhancement of the contrast, which in turn generates a more accurate image. Contrast agents for MRI that are available may be injected intravenously to enhance the appearance of tumors, blood vessels and/or inflammation for example. Contrast agents may also be directly injected into a joint, for MR images of joints, referred to as arthrograms. Contrast agents may also be taken orally for some imaging techniques. Contrast agents generally work by altering the relaxation parameters, $T_1$, $T_2$ or $T_2^*$, such as by shortening these relaxation times.

Since MRI images can be generated from an analysis of the $T_1$ or $T_2$ parameters discussed above, it is desirable to have a contrast agent which affects either or both parameters. Much research has, therefore, centered around two general classes of magnetically active materials: paramagnetic materials (which act primarily to decrease $T_1$) and ferromagnetic materials (which act primarily to decrease $T_2$).

Paramagnetism occurs in materials that contain unpaired electrons which do not interact and are not coupled. Paramagnetic materials are characterized by a weak magnetic susceptibility, where susceptibility is the degree of response to an applied magnetic field. They become weakly magnetic in the presence of a magnetic field, and rapidly lose such activity (i.e., demagnetize) once the external field is removed. It has long been recognized that the addition of paramagnetic solutes to water causes a decrease in the $T_1$ parameter.

Because of such effects on $T_1$ a number of paramagnetic materials have been used as NMR contrast agents. However, a major problem with the use of contrast agents for imaging is that many of the paramagnetic and ferromagnetic materials exert toxic effects on biological systems making them inappropriate for in vivo use. Because of problems inherent with the use of many presently available contrast agents, there exists a need for new agents adaptable for clinical use. In order to be suitable for in vivo diagnostic use, such agents must combine low toxicity with an array of properties including superior contrasting ability, ease of administration, specific bio-distribution (permitting a variety of organs to be targeted), and a size sufficiently small to permit free circulation through a subject's vascular system or by blood perfusion (a typical route for delivery of the agent to various organs). Additionally, the agents must be stable in vivo for a sufficient time to permit the clinical study to be accomplished, yet capable of being ultimately metabolized and/or excreted by the subject.

A $T_1$ agent primarily acts to brighten up the tissues where the agent is present due to its ability to enhance the longitudinal relaxation rate of protons from water ($1/T_1$). All the $T_1$ contrast agents currently used in clinical MRI imaging are gadolinium-based paramagnetic complexes with various polyaminopolycarboxylate ligands. 4-8 Gadolinium (Gd) is a rare-earth metal that can form a stable 3+ ion with 7 unpaired electrons ($4f^7$, S=7/2), the highest number of unpaired electrons (or magnetic spins) per metal center obtainable by any metallic element in the periodic table. The most noticeable feature in all these complexes is the water coordination to the metal center, which provides an important mechanism for enhancing the proton's longitudinal relaxation rate for this water and the surrounding water molecules.

Although gadolinium-enhanced tissues and fluids appear brighter on $T_1$-weighted images, which provides high sensitivity for detection of vascular tissues (e.g. tumors) and permits assessment of brain perfusion (e.g. in stroke), such compounds also have problems and risks. The relaxivity decreases with increasing magnetic field, and thus higher dosages are required to achieve the same contrast with higher magnetic fields. There have been concerns raised regarding the toxicity of gadolinium-based contrast agents and their impact, particularly on people with impaired kidney function. Both the free $Gd^{3+}$ ions and the polyaminopolycarboxylate ligand molecules used to sequester the metal ions exhibit in vivo toxicity. Previously, it was assumed that the formation of a chelate between the metal ions and the ligand molecules with high thermodynamic stability and kinetic inertness can prevent the complexes from falling apart, thus reducing the toxicity. Unfortunately, the complex biochemical, pharmacokinetic and metabolic properties of such chelates often render the in vitro working model based on the thermodynamic and kinetic stability considerations inadequate for predicting their in vivo safe delivery. Use of these compounds has been linked to nephrogenic systemic fibrosis (NSF) and nephrogenic fibrosing dermopathy (NFD) for example. The renal toxicity of such agents has also prompted the US FDA to issue a public health advisory regarding the risk of using such agents. Additionally, such compounds are not possible to take orally, requiring intravenous administration, and do not act intracellularly but only extracellularly, thereby limiting their effectiveness.

The second type of contrast agents (i.e. $T_2$ agents) that have been recently approved for clinical use is from the family of iron oxide nanoparticles. These include superparamagnetic iron oxides (SPIO; 50-500 nm) and ultrasmall superparamagnetic iron oxides (USPIOs; 5-50 nm). In contrast to $Gd^{3+}$-based MRI contrast agents, iron oxide nanoparticles can only increase the transverse relaxation rate of protons from water ($1/T_2$), thus producing darkened spots in the tissues where the drug is present. From the standpoint of clinical diagnostic imaging, $T_2$ agents produce much less useful information. Such materials have been used for liver imaging, as normal liver tissue retains the agent, but abnormal areas (e.g. scars, tumors) do not.

It should be noted that both the $Gd^{3+}$-based $T_1$ agents and iron oxide-based $T_2$ agents are unstable in the acidic environment of the stomach, which has prevented them from being ever considered for oral delivery. Consequently, these materials can only be intravenously administered. In order to develop any new $T_1$ agent, the water molecules from the surroundings need to be able to exchange with the inner-sphere water molecules, and reside on the metal sites on and off, which can provide a mechanism for water's protons to significantly shorten their $T_1$ relaxation time, thus increasing the proton's magnetic resonance signal intensity (i.e. imaging contrast).

It would be desirable to provide MRI contrast agents which alleviates concerns with known agents and allows high contrast images to be achieved, with low toxicity. It would also be desirable to provide a MRI contrast agent that provides specific bio-distribution, cellular imaging and permits free circulation through a patient's vascular system. Further, the qualities of ease of administration, such as by oral delivery methods, and providing stability in vivo for a sufficient time to permit the clinical study to be accomplished, while being ultimately metabolized and/or excreted by the subject, are needed. It would also be advantageous to provide a contrast agent that may allow both $T_1$ and $T_2$ imaging techniques to be performed.

SUMMARY OF THE INVENTION

The contrast agents of the present invention comprise gadolinium doped (containing) Prussian blue (PB) crystals or lattices that can greatly decrease the relaxation times $T_1$ and $T_2$ of water in tissues as well as have very low leach rates because of a low solubility product constant of the parent Prussian blue structure in strong acidic solutions or water. The amount of gadolinium, i.e. $Gd^{3+}$ ion that is substituted for the original ferric ion, i.e. $Fe^{3+}$ ion, in the Prussian blue lattice can range from about 1% to about 100%, desirably from about 10% to about 90%, and preferably from about 10% to about 50% of the total $Fe^{3+}$ ions originally present. The contrast agents are well suited for use in magnetic resonance imaging (MRI) and can be added to animals or human beings either intravenously or orally. Prussian blue particles are very small and desirably are of a nanosize and can have the formula $A_{4x}Fe_{4-x}{}^{III}[Fe^{II}(CN)_6]_{3+x} \cdot nH_2O$ wherein A comprises $Li^+$, $Na^+$, $K^+$, $Rb^+$, $Cs^+$, $NH_4{}^+$ and $Tl^+$, or any combination thereof, x is any number from 0 to about 1, and n is generally from about 1 to about 24. The particles are effective for specific bio-distribution (permitting a variety of organs to be targeted for contrast enhancement such as cellular imaging), and have a size sufficiently small to permit free circulation through a subject's vascular system (a typical route for delivery of the agent to various organs). Additionally, the agents are stable in vivo for a sufficient time to permit the clinical study to be accomplished, yet capable of being ultimately metabolized and/or excreted by the subject. The $Gd^{3+}$-incorporated Prussian blue compounds, either in a bulk form or as nanoparticles, having a size of from about 5 to about 300 nm, can be used as a $T_1$-weighted and/or $T_2$-weighted MRI contrast agent.

Although not necessary for MRI analysis, the $Gd^{3+}$ containing Prussian blue compounds of the present invention can be taken up by cells through endocytosis. Endocytosis is the process by which cells absorb material (molecules such as proteins) from outside the cell by engulfing it with their cell membrane. It is used by all cells of the body because most substances important to the cells are large polar molecules that cannot pass through the hydrophobic plasma membrane or cell membrane. As used throughout this disclosure, a "patient" or "subject" to be treated by the subject method can mean either a human or non-human subject such as an animal, an organ, a tissue, a cell, and the like.

In general, a contrast agent comprises a Prussian blue lattice compound doped with gadolinium ($Gd^{3+}$) atoms.

In general, a process for forming a contrast agent, comprises the steps of: reacting gadolinium ($Gd^{3+}$) ions and a ferrous salt with a soluble ferriccyanide ([$Fe^{III}(CN)_6$]$^{3-}$), or reacting gadolinium ($Gd^{3+}$) ions and a ferric salt with a soluble ferrocyanide ([$Fe^{II}(CN)_6$]$^{4-}$); in the presence of a carboxylic acid, and forming a gadolinium ($Gd^{3+}$) doped Prussian blue nanoparticle lattice compound.

DETAILED DESCRIPTION OF THE INVENTION

Figure 1:
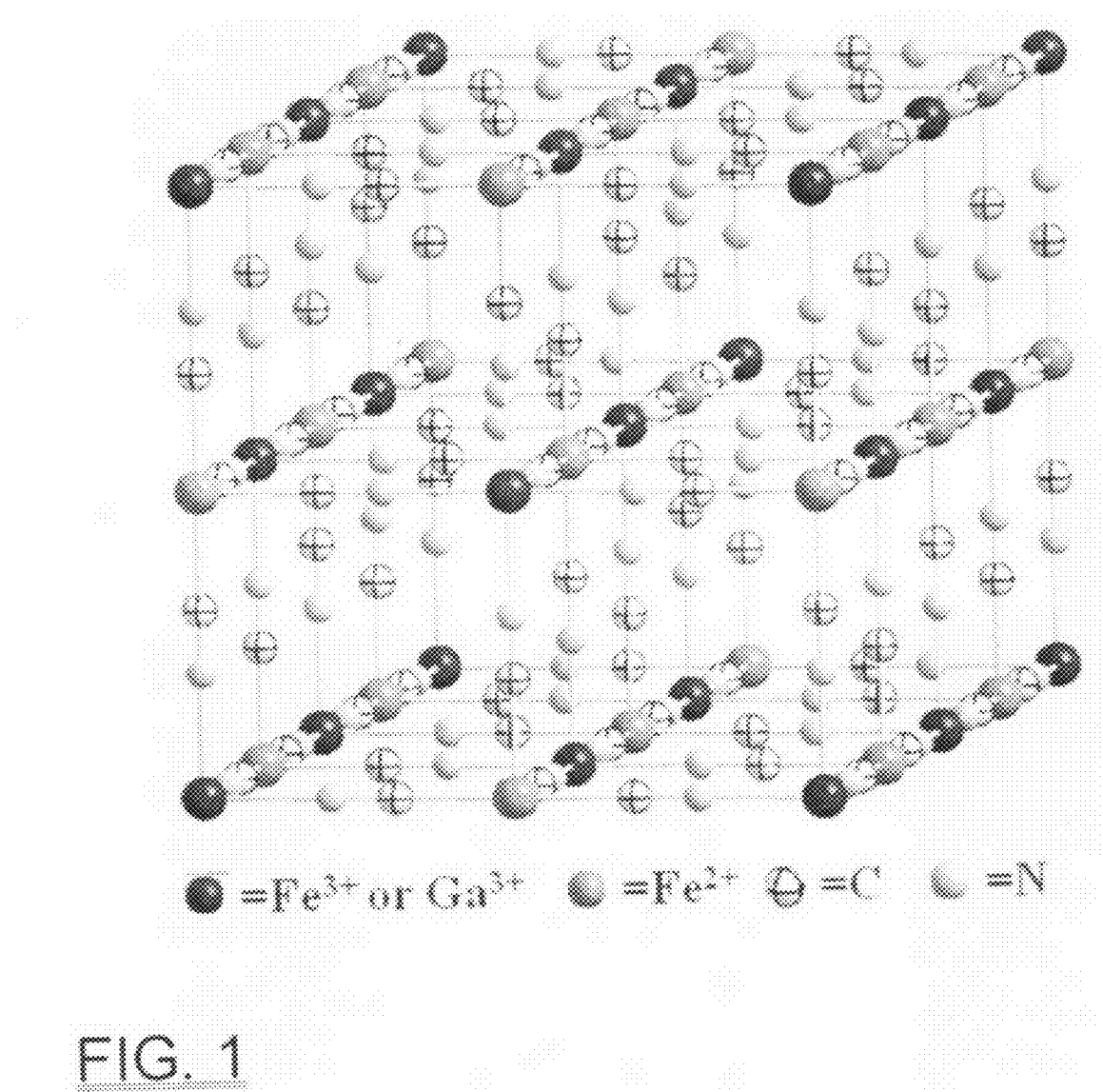
FIG. 1 is a perspective view showing the crystalline lattice structure of one embodiment of an idealized Prussian blue crystal.

The contrast agent of the present invention is derived from Prussian blue. As background, Prussian blue has been used as a pigment in industry and for artists since about 1704. On Oct. 2, 2003, the US Food and Drug Administration (FDA) determined that Prussian blue capsules, manufactured and marketed by HEYL Chemisch-pharmazeutische Fabrik GmbH & Co. KG as Radiogardase™, were safe and approved their use for the treatment of internal contamination with radioactive cesium, radioactive thallium, or non-radioactive thallium in humans.

Prussian blue is a compound that belongs to the class of iron hexacyanoferrate (II) and has the following formula:

$$Fe_4{}^{III}[Fe^{II}(CN)_6]_3 \cdot nH_2O \qquad \text{Formula 1}$$

wherein the value n represents an integer from 1 to about 24.

The Prussian blue compounds can also be salts having the formula:

$$A_{4x}Fe_{4-x}{}^{III}[Fe^{II}(CN)_6]_{3+x} \cdot nH_2O \qquad \text{Formula 2}$$

where A is an alkali metal such as lithium ($Li+$), sodium ($Na^+$), Potassium ($K^+$), Rubidium ($Rb^+$), Cesium ($Cs^+$), or it can be Ammonium ($NH_4{}^+$) or Thallium ($Tl^+$). The value x can be any number, e.g. a fraction, from $0 \leq x \leq 1$, e.g. 0.1 and n is about 1 to about 24, and preferably is from about 14 to about 16. The Prussian blue compound can be a soluble compound or an insoluble compound, wherein the insoluble compound is characterized by coordinating water molecules therein.

As apparent from the above formulas, Prussian blue is a mixed-valence iron hexacyanoferrate, i.e. $Fe^{2+}$ and $Fe^{3+}$ that is commercially available and can be made by several different processes. One process involves precipitating ferrous ferrocyanide from a solution of ferrocyanide and ferrous sulfate. Subsequent oxidation produces a complex ferri/ferrocyanide, the shade and pigment properties of which are dependent upon the oxidizing agent, reactant concentrations, pH, temperature, size of batch, and other reaction conditions. Typical oxidants include nitric acid, sulfuric acid, and potassium dichromate with sulfuric acid, perchlorates, and peroxides. Another process or synthesis of the Prussian blue nanoparticles utilizes different variations of the multicomponent reverse micelle technique, (i.e. the formation of water-in-oil microemulsions), or the direct precipitation process in a polymeric or a biological matrix. Another and preferred route utilizes an aqueous solution route for preparing Prussian blue nanoparticles that does not require the use of any organic or polymeric additives as are required for a water-in-oil microemulsion route. The aqueous solution route provides a simple and cost-effective approach to forming the modified or doped Prussian blue compounds of the present invention.

General Procedure for Preparation of Gd-Incorporated Prussian Blue Contrast Agents $$Fe^{3+} + Gd^{3+} + [Fe^{II}(CN)_6]^{4-} + \text{Carboxylic acid} \rightarrow \text{PB nanoparticles, or} \qquad \text{Formula 3}$$

$$Fe^{2+} + Gd^{3+} + [Fe^{III}(CN)_6]^{3-} + \text{Carboxylic acid} \rightarrow \text{PB nanoparticles} \qquad \text{Formula 4}$$

An aqueous solution is defined as a solution in which the solvent is substantially water. The word aqueous is defined as pertaining to, related to, similar to, or dissolved in water. A proper concentration [i.e. $10^{-3}$ to $10^3$ M] of a ferric salt containing a proper amount of $Gd^{3+}$ ions, that is, a sufficient amount so that the $Gd^{3+}$ Prussian blue lattices contain from about 1% to about 100% of $Gd^{3+}$ ions therein in lieu of $Fe^{3+}$ ions, is mixed with a proper concentration [$10^{-3}$ to $10^3$ M] of soluble ferrocyanide [$Fe^{II}(CN)_6$]$^{4-}$ to form a precursor solution or alternatively, a ferrous salt [$10^{-3}$ to $10^3$ M] containing a proper amount of $Gd^{3+}$ ions is mixed with a proper concentration [$10^{-3}$ to $10^3$ M] of soluble ferriccyanide [$Fe^{III}(CN)_6$]$^{3-}$ to form a precursor solution. The ferric salt or the ferrous salt can be a chloride, perchlorate, nitrate or a sulfate of iron (II), or of iron (III), or any other soluble salt of iron (II) or iron (III), and the $Gd^{3+}$ ion can be a salt of a chloride, perchloride, nitrate, or a sulfate or any other soluble salt of $Gd^{3+}$. The method also utilizes the complexation of the ferric ions and $Gd^{3+}$ ions by a carboxylic acid as the precursor to reduce the rate of nucleation when this precursor reacts with ferrocyanide. The carboxylic acid is preferably added with either the gadolinium ions and iron salt, or with the soluble cyanide solution, or both, or it can be added to the reaction mixture after commencement of the reaction but before completion thereof. As the $Gd^{3+}$-incorporated Prussian blue nanoparticles begin to form in situ, the same carboxylic acid can act as a surface-capping agent to control the size and prevent agglomeration.

A surface capping agent can be added to either one of the above-mentioned precursor solutions or both before mixing the solutions. The surface capping agent can be used to control the growth of the Prussian blue materials in the nanometer region. The surface capping agent can be a biocompatible carboxylic compound. The carboxylic compounds typically have a total of from 2 to about 12 carbon atoms and generally contain one or more carboxylic acid groups, that is, mono acids, or polyacids such as diacids, triacids, etc., that optionally, and independently, can contain 1, 2, or 3 or more hydroxyl groups and include, but are not limited to acetic acid, oxalic acid, citric acid, tartaric acid, adipic acid, or gluconic acid, or any combination thereof. The use of a carboxylic acid capping agent allows effective control of the size of the nanoparticles and stabilizes the Prussian blue nanoparticles. It was found that without the capping agent, such particles can aggregate to form precipitate containing particles larger than 300 nm in about two hours. The amount of the carboxylic acid is from about 0.1 to about 100 molar equivalents of ferric or ferrous ions used in the synthesis.

According to the present invention, the insertion of $Gd^{3+}$ ions into the Prussian blue crystalline lattice gives unexpected and synergistic properties such as with respect to high relaxivity values and low toxicity. The doping process with respect to the insertion of the $Gd^{3+}$ ions into the Prussian blue lattice whereby $Fe^{3+}$ ions are replaced is carried out in situ, that is simultaneously during the synthesis of the Prussian blue particles. While the substitution of the $Gd^{3+}$ ions for the $Fe^{3+}$ ions can be carried out post-synthetically, the same is not preferred nor desired. Post-synthetical insertion of $Gd^{3+}$ ions into the PB structure typically cannot be done because once the lattice is formed, it is too stable for replacement of metal ions. A typical in situ synthesis can be carried out with various amounts of the ferric ions replaced by the $Gd^{3+}$ ions in the startin solution, that is from 1% to about 100%, while the total concentration of the two ions is kept constant (e.g. 1 mM). After a proper amount of a carboxylic acid, is added to the above solution containing the two different ions, this precursor solution is then mixed with approximately an equimolar solution (±50%) and preferably (±10%) of either [$Fe^{II}(CN)_6$]$^{4-}$ or [$Fe^{III}(CN)_6$]$^{3-}$ at room temperature to form the $Gd^{3+}$-incorporated nanoparticles generally within 5 minutes. The product can be isolated by centrifugation and washing with a water-acetone mixture (30:70 v/v), preferably three times, to remove any unreacted starting materials or by-products. The substitution level of $Gd^{3+}$ for $Fe^{3+}$ can range from about 1% to about 100%, desirably from about 10% to about 90%, and preferably from about 10% to about 50%. Generally, substituted amounts in excess of 50% of $Gd^{3+}$ ions in the original Prussian blue lattice, based upon the original amount of $Fe^{3+}$, are generally unstable. The reaction temperature can vary from about 0° C. to about 100° C., desirably from about 10° C. to about 80° C., and preferably from about 10° C. to about 60° C. The proper total concentration of $Gd^{3+}$ and $Fe^{3+}$ ions in the precursor solution can range from about $10^{-4}$ M to about $10^2$ M, desirably from about $10^{-3}$ M to about 10 M, and preferably from about $10^{-3}$ M to 0.1 M.

The utilization of a Prussian blue lattice leads to increased molecular mass, a reduced molecular tumbling rate, as well as increased rigidity, thus resulting in much higher relaxivity values of the Prussian blue lattice containing $Gd^{3+}$ ions therein. Moreover, the strong ligand-feel effect of the $CN^-$ group and the extended three-dimensional structure results in the $Gd^{3+}$ ion containing Prussian blue having an extreme low solubility product constant, i.e. $K_{sp}=10^{-41}$. This extreme low solubility constant of course results in extremely low amounts of generally less than about 10 parts per million and desirably less than about 200 parts per billion of free $Gd^{3+}$ ions that are released to the aqueous solution based upon the total $Gd^{3+}$ parts (wt) in the nanoparticles such as at a pH of about 2 to about 7.5. The level of release $Gd^{3+}$ ions is so low that it falls below the test limit of the well known ICP-MS test of less than 15 parts per billion based upon the total $Gd^{3+}$ ion parts in the nanoparticles. Thus, the contrast agents of the present invention are not toxic and well within currently tolerable limits of free $Gd^{3+}$ ions by animals and humans (i.e. ppm or parts per million of $Gd^{3+}$ ions).

Another advantage of the $Gd^{3+}$ containing Prussian blue lattices are that the formed particles thereof are small, generally from about 5 to about 300 nanometers, desirably from about 10 to about 150 nanometers, and preferably from about 10 to about 50 nanometers in average diameter. The average molecular weight contained within the $Gd^{3+}$-incorporated Prussian blue nanoparticles with the size of 50 nm can exceed one million Daltons, much higher than those of commercial $Gd^{3+}$-chelates (i.e. several hundred Daltons). In addition, the $Gd^{3+}$-incorporated Prussian blue nanoparticles have high structural rigidity, which results in higher $r_1$ relaxivity values. Another advantage of the $Gd^{3+}$ ion containing Prussian blue lattice nanoparticles is that they substantially do not agglomerate because the nanoparticle surfaces are capped by the carboxylate molecule. As known to those skilled in the art, relaxivity, i.e. $r_1$, is the measure of efficiency of a contrast agent and normally is quoted as a concentration-normalized rate $r_1$, i.e. $mM^{-1} \times s^{-1}$ wherein $mM^{-1}$ is the reciprocal unit concentration in millimoles of the contrast agent and $s^{-1}$ is the reciprocal time in seconds. Naturally, short times can be achieved when the $Gd^{3+}$ doped Prussian blue nanoparticles are utilized as the contrast agent in an MRI apparatus.

Currently, typical commercial contrast agents have a relaxivity value ($r_1$) of approximately 4.1 $mM^{-1} \times s^{-1}$ at the currently most common magnetic field strength of 1.5 Tesla (T). However, as noted in the Background of the Invention, in order to obtain good results with respect to the contrast agents, values higher than 0.1 millimole of contrast agent in the body is required, and this value can increase to such as high as 0.3 millimole or approximately 28 milligrams per kilogram of body weight in order to obtain an adequate contrast image. Furthermore, when the magnetic field strength is increased to 3.0 or 7.0 Tesla, performance of current commercial agents generally is poor. In contrast thereto, the $Gd^{3+}$ doped Prussian blue nanoparticles of the present invention have relaxivity values ($r_1$) that range from about 6.5 mM$^{-1}$×s$^{-1}$ to about 175 mM$^{-1}$×s$^{-1}$, desirably from about 6.5 mM$^{-1}$×s$^{-1}$ to about 125 mM$^{-1}$×s$^{-1}$, and preferably from about 12 mM$^{-1}$×s$^{-1}$ to about 25 mM$^{-1}$×s$^{-1}$ at the magnetic field strength of approximately 1.5 Tesla. At the magnetic field strength of 7.0 Tesla, relaxivity values for $r_1$-weighted MRI ranged generally are from about 4.5 mM$^{-1}$×s$^{-1}$ to about 65, desirably from about 4.5 to about 45, and preferably from about 5.0 to about 25 mM$^{-1}$×s$^{-1}$. Such unexpected results gave good image contrast as well. Thus, where sensitivity is necessary or indispensable, the present invention can be utilized as an MRI contrast agent. Alternatively, for routine medical screenings where high relaxivity values are not absolutely necessary, the concentration of the amount of the $Gd^{3+}$ Prussian blue nanoparticles can be reduced by as much as 10 to 100 times compared to typical contrast agents such as Magnevist™ or Omiscan™.

The following examples serve to illustrate, but not to limit the scope of the present invention with an example of the gadolinium Gd3+ Prussian blue lattice compound set forth in FIG. 1.

EXAMPLE ONE

As an example, citrate-coated $Gd^{3+}$-incorporated Prussian blue nanoparticles were prepared by slowly adding 20 mL of 1.0 mM solution with the mole fraction ratio of $[FeCl_3]/[GdCl_3]=9:1$ containing 0.5 mmol of citric acid into an equimolar $K_4[Fe(CN)_6]$ solution containing 0.5 mmol of citric acid under rigorous stirring at room temperature for three minutes. The product was isolated by centrifugation and washing with a water-acetone mixture (30:70 v/v) three times. The X-ray powder diffraction studies showed that the XRD pattern can be indexed into the cubic face-centered Prussian blue phase (space group Fm3m). Transmission electronic microscopy (TEM) analysis revealed that the nanoparticles are well-formed square platelets and narrowly distributed with an average diameter of ca. 13±3 nm. Dynamic light scattering (DLS) measurements showed the hydrodynamic diameter of the PB nanoparticles to be 20 nm. Elemental analysis confirmed the ratio of all Fe/Gd to be close to 19:1.

EXAMPLE TWO

Similar $Gd^{3+}$-incorporated Prussian blue nanoparticles were also prepared by mixing 20 mL of 1.0 mM solution with the mole fraction ratio of $[FeCl_2]/[GdCl_3]=5:5$ containing 0.5 mmol of citric acid into an equimolar $K_3[Fe(CN)_6]$ solution containing 0.5 mmol of citric acid under rigorous stirring at room temperature for three minutes. The product, after isolated by centrifugation and washing with a water-acetone mixture (30:70 v/v) three times, showed virtually identical characteristics as that prepared by the above method, except that the ratio of all Fe/Gd to be close to 3:1.

EXAMPLE THREE

Yet another method for the preparation of $Gd^{3+}$-incorporated Prussian blue nanoparticles required the use of 20 mL of 1.0 mM solution with the mole fraction ratio of $[FeCl_3]/[GdCl_3]=6:4$ containing 0.5 mmol of citric acid, and another solution of an equimolar $K_3[Fe(CN)_6]$ solution containing 0.5 mmol of citric acid. The two solutions were mixed in the dark, and exposed to sunlight for 30 minutes. The $Gd^{3+}$-incorporated nanoparticles were formed slowly along with a gradual change of solution color from light green to deep blue in 5-10 minutes. The product was isolated by centrifugation and washing with a water-acetone mixture (30:70 v/v) three times, and showed the ratio of all Fe/Gd to be close to 4:1.

The $Gd^{3+}$-PB contrast agents of the present invention are very versatile and can be utilized in numerous applications such as molecular or cellular probes for spectroscopy and microscopy, and contrast agents for various imaging modalities apparatuses.

The materials and methods as described above are not to be construed as limiting the invention to any certain application or example. The contrast agent and imaging method, or the related materials or methods disclosed herein may also be used for other medical imaging techniques, drug delivery applications, or other clinical diagnostic applications and biomedical research applications.

While in accordance with the patent statutes the best mode and preferred embodiment have been set forth, the scope of the invention is not intended to be limited thereto, but only by the scope of the attached claims.

What is claimed is:

1. A contrast agent, comprising:
Prussian blue lattice nanoparticles doped with gadolinium ($Gd^{3+}$) atoms, wherein said
Prussian blue lattice compound has the general formula

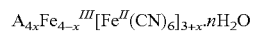

wherein A is Li$^+$, Na$^+$, K$^+$, Rb$^+$, Cs$^+$, NH$^{4+}$ or Tl$^+$, or any combination thereof; x is from 0 to about 1; and n is from 1 to about 24.

2. The contrast agent of claim 1 wherein from about 1% to 100% of the original Fe$^{3+}$ ions of said Prussian blue lattice compound have been replaced by said gadolinium ($Gd^{3+}$) atoms, and wherein said gadolinium ($Gd^{3+}$) containing Prussian blue lattice nanoparticles have a particle size of from about 5 to about 300 nanometers.

3. The contrast agent of claim 2, wherein the amount of said gadolinium ($Gd^{3+}$) atoms is from about 10% to about 50%, and wherein said gadolinium ($Gd^{3+}$) containing Prussian blue lattice nanoparticles particle size is from about 10 to about 150 nanometers.

4. The contrast agent of claim 3, wherein the gadolinium ($Gd^{3+}$) containing Prussian blue lattice nanoparticles particle size is from about 10 to about 50 nanometers.

5. The contrast agent of claim 1, wherein said gadolinium ($Gd^{3+}$) doped Prussian blue lattice nanoparticles have a concentration normalized rate value of from about 6.5 to about 175 mM$^{-1}$×s$^{-1}$ at 1.5 Tesla.

6. The contrast agent of claim 4, wherein said gadolinium ($Gd^{3+}$) doped Prussian blue lattice nanoparticle have a $T_1$ value of from about 12 to about 25 mM$^{-1}$×s$^{-1}$ at 1.5 Tesla.

7. The contrast agent of claim 1, wherein the amount of released gadolinium ($Gd^{3+}$) ion according to an ICP-MS test is less than about 10 parts per million in an aqueous solution having a pH of from about 2 to about 7.5.

8. The contrast agent of claim 3, wherein the amount of released gadolinium ($Gd^{3+}$) ion according to an test is less than 15 parts per billion in an aqueous solution having a pH of from about 2 to about 7.5.

9. The contrast agent of claim 6, wherein the amount of released gadolinium ($Gd^{3+}$) ion according to an ICP-MS test is less than about 200 parts per billion in an aqueous solution having a pH of from about 2 to about 7.5.

10. A process for forming a contrast agent, comprising the steps of:
reacting gadolinium ($Gd^{3+}$) ions and a ferrous salt with a soluble ferricyanide ($[Fe^{III}(CN)_6]^{3-}$), or
reacting gadolinium ($Gd^{3+}$) ions and a ferric salt with a soluble ferrocyanide ($[Fe^{II}(CN)_6]^{4-}$);
in the presence of a carboxylic acid, and forming a gadolinium ($Gd^{3+}$) doped Prussian blue nanoparticle lattice compound.

11. The process of claim 10, wherein said carboxylic acid is a monocarboxylic acid, or a polycarboxylic acid that optionally, independently, contain 1, 2, 3, or more hydroxyl groups therein, and any combination thereof; and
wherein said ferric salt, said ferrous salt, and said gadolinium (III) ions are all water soluable.

12. The process of claim 11, wherein said carboxylic acid is acetic acid, oxalic acid, citric acid, tartaric acid, adipic acid, or gluconic acid, or any combination thereof, and wherein said ferric salt, said ferrous salt, and said gadolinium ($Gd^{3+}$) ion is a salt of a chloride, a sulfate, a nitrate, or a perchlorate, or any combination thereof.

13. The process of claim 10, wherein the particle size of said gadolinium ($Gd^{3+}$) Prussian blue lattice compound is from about 5 to about 300 nanometers; and wherein said gadolinium ($Gd^{3+}$) ions in said lattice is an amount of from 1% to about 100% of all $Fe^{3+}$ valence ions therein.

14. The process of claim 11, wherein the particle size of said gadolinium ($Gd^{3+}$) Prussian blue lattice compound is from about 10 to about 150 nanometers; and wherein said gadolinium ($Gd^{3+}$) ions in said lattice is an amount of from 10% to about 90% of all $Fe^{3+}$ ions therein.

15. The process of claim 12, wherein the particle size of said gadolinium ($Gd^{3+}$) doped Prussian blue lattice compound is from about 10 to about 50 nanometers; and wherein said gadolinium ($Gd^{3+}$) ions in said lattice is an amount of from 10% to about 50% of all $Fe^{3+}$ ions therein.

16. The process of claim 10, wherein said gadolinium ($Gd^{3+}$) doped Prussian blue lattice compound has a $T_1$ value of from about 6.5 to about 175 at 1.5 Telsa.

17. The process of claim 12, wherein said gadolinium ($Gd^{3+}$) doped Prussian blue lattice compound has a $T_1$ value of from about 6:5 to about 175 at 1.5 Telsa.

18. The process of claim 13, wherein said gadolinium ($Gd^{3+}$) doped Prussian blue lattice compound has a $T_1$ value of from about 6.5 to about 125 at 1.5 Telsa.

19. The process of claim 15, wherein said gadolinium ($Gd^{3+}$) doped Prussian blue lattice compound has a $T_1$ value of from about 12 to about 25 at 1.5 Telsa.

* * * * *

UNITED STATES PATENT AND TRADEMARK OFFICE
CERTIFICATE OF CORRECTION

| | | |
|---|---|---|
| PATENT NO. | : 8,092,783 B2 | Page 1 of 1 |
| APPLICATION NO. | : 12/384391 | |
| DATED | : January 10, 2012 | |
| INVENTOR(S) | : Songping D. Huang et al. | |

It is certified that error appears in the above-identified patent and that said Letters Patent is hereby corrected as shown below:

In Column 12, line 34 (Claim 1). After the first "or" should be "TI+" instead of "T1+".

In Column 12, line 63 (Claim 8). The words --ICP-MS-- should be inserted before the word "test".

Signed and Sealed this
Thirteenth Day of March, 2012

David J. Kappos
*Director of the United States Patent and Trademark Office*